US012558859B2

(12) United States Patent
Gentils et al.

(10) Patent No.:   US 12,558,859 B2
(45) Date of Patent:   Feb. 24, 2026

(54) METHOD FOR SUPPLYING A MOLDING DEVICE WITH POLYMERIZABLE MIXTURE

(71) Applicant: Essilor International, Charenton-le-pont (FR)

(72) Inventors: Hervé Gentils, Charenton-le-pont (FR); Eric Veque, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 18/278,525

(22) PCT Filed: Feb. 25, 2022

(86) PCT No.: PCT/EP2022/054867
§ 371 (c)(1),
(2) Date: Aug. 23, 2023

(87) PCT Pub. No.: WO2022/180240
PCT Pub. Date: Sep. 1, 2022

(65) Prior Publication Data
US 2024/0051191 A1     Feb. 15, 2024

(30) Foreign Application Priority Data

Feb. 26, 2021   (EP) .................................... 21305231

(51) Int. Cl.
B29D 11/00 (2006.01)
B29C 31/04 (2006.01)
(Continued)

(52) U.S. Cl.
CPC ........ B29D 11/00038 (2013.01); B29C 31/04 (2013.01); B29C 37/006 (2013.01);
(Continued)

(58) Field of Classification Search
CPC ................... B29C 39/24; B29C 37/006; B29L 2011/0016
See application file for complete search history.

(56) References Cited

U.S. PATENT DOCUMENTS 3,212,128 A * 10/1965 Carlson ................. B29C 44/388
141/82
4,307,760 A * 12/1981 Hauser .................. B29B 7/7471
141/82
(Continued)

FOREIGN PATENT DOCUMENTS

CN       101835580       9/2010
CN       105848844       8/2016
(Continued)

OTHER PUBLICATIONS

International Search Report issued in corresponding PCT Application No. PCT/EP2022/054867, mailed May 2, 2022.

*Primary Examiner* — Benjamin A Schiffman
(74) *Attorney, Agent, or Firm* — Norton Rose Fulbright US LLP

(57) ABSTRACT

The invention relates to a method for supplying a polymerizable mixture to at least one molding device, said method comprising the following steps: a) providing a tank containing the polymerizable mixture (box E1), b) reaching a set value of pressure (Ps) in the tank, smaller than the ambient pressure (box E2), c) continuously maintaining the pressure (P) in the tank at the set value of pressure while supplying the polymerizable mixture to the molding device (boxes E3, E4, E41, E42, E5, E51). The invention also relates to a supply device for supplying the molding device with polymerizable mixture.

7 Claims, 3 Drawing Sheets

(51) Int. Cl.

| | | |
|---|---|---|
| *B29C 37/00* | (2006.01) | |
| *B29C 39/24* | (2006.01) | |
| *B29C 39/42* | (2006.01) | |
| *B29C 39/44* | (2006.01) | |
| *B29L 11/00* | (2006.01) | |

(52) U.S. Cl.

CPC .............. *B29C 39/24* (2013.01); *B29C 39/42* (2013.01); *B29C 39/44* (2013.01); *B29D 11/00125* (2013.01); *B29C 2791/005* (2013.01); *B29C 2791/006* (2013.01); *B29L 2011/0016* (2013.01)

(56) References Cited

U.S. PATENT DOCUMENTS

| | | | | |
|---|---|---|---|---|
| 5,154,832 A | * | 10/1992 | Yamamura .............. | B01F 23/23 |
| | | | | 210/321.74 |
| 5,187,001 A | * | 2/1993 | Brew ................... | B29B 7/7471 |
| | | | | 425/557 |
| 5,382,394 A | * | 1/1995 | Terhardt ............... | B29B 7/7466 |
| | | | | 264/102 |
| 5,425,803 A | | 6/1995 | Van Schravendijk et al. | |
| 5,435,943 A | * | 7/1995 | Adams ............. | B29D 11/00432 |
| | | | | 264/1.1 |
| 5,658,602 A | * | 8/1997 | Martin ................. | B29C 33/303 |
| | | | | 425/453 |
| 5,922,249 A | | 7/1999 | Ajello et al. | |
| 6,811,592 B2 | | 11/2004 | Young et al. | |
| 7,614,527 B2 | * | 11/2009 | Freson ............. | B29D 11/00432 |
| | | | | 222/266 |
| 7,919,020 B2 | * | 4/2011 | Hamanaka ............. | B29C 39/24 |
| | | | | 264/1.32 |
| 10,766,179 B2 | * | 9/2020 | Veque ................. | B29C 45/1866 |
| 2006/0110488 A1 | * | 5/2006 | Saikin ...................... | B29B 7/90 |
| | | | | 425/447 |
| 2006/0145380 A1 | * | 7/2006 | Renkl .................... | B29B 7/726 |
| | | | | 264/40.1 |
| 2009/0145461 A1 | * | 6/2009 | Rastogi ............. | B01D 19/0036 |
| | | | | 95/45 |
| 2017/0348887 A1 | | 12/2017 | Veque et al. | |
| 2021/0071861 A1 | * | 3/2021 | Beldon ................... | F22B 1/16 |
| 2024/0157609 A1 | * | 5/2024 | Gentils .................. | B29C 31/02 |

FOREIGN PATENT DOCUMENTS

| | | | | |
|---|---|---|---|---|
| EP | 0118073 | 9/1984 | | |
| EP | 0316541 | 5/1989 | | |
| EP | 0409656 A2 | * | 1/1991 | ............. B29C 39/44 |
| EP | 1431022 | 6/2004 | | |
| EP | 2656991 | 10/2013 | | |

* cited by examiner

METHOD FOR SUPPLYING A MOLDING DEVICE WITH POLYMERIZABLE MIXTURE

CROSS-REFERENCE TO RELATED APPLICATIONS

This application is a national phase application under 35 U.S.C. § 371 of International Application No. PCT/EP2022/054867 filed 25 Feb. 2022, which claims priority to European Patent Application No. 21305231.9 filed 26 Feb. 2021. The entire contents of each of the above-referenced disclosures is specifically incorporated by reference herein without disclaimer.

BACKGROUND

Field of the Invention

The invention belongs to the field of molding.

The invention more precisely relates to a method for supplying at least a molding device with a polymerizable mixture.

The invention also relates to a supply device for supplying at least a molding device with a polymerizable mixture.

The invention finds particularly advantageous, but not exclusive, application for the manufacturing of transparent optical articles such as ophthalmic lenses, and notably lenses for spectacles and sunglasses or vision correcting spectacles.

Description of Related Art

It is known to supply a molding device with polymerizable mixture by introducing nitrogen in a tank where is stored the polymerizable mixture. Such introduction of nitrogen increases the pressure inside said tank and therefore pushes the polymerizable mixture towards the molding device.

However, some gas can thus be dissolved in the polymerizable mixture and may result in bubbles trapped inside the final molded article, said molded article being then considered as defective. In general terms, any gas, either already present in the tank or newly generated (due for example to the presence of water), can be dissolved in the polymerizable mixture before the supply of the molding device and therefore induce a defective molded article.

SUMMARY OF THE INVENTION

One object of the invention is to provide a method for supplying a polymerizable mixture that allows reducing the quantity of defective molded articles exhibiting bubbles trapped therein.

A further object of the invention is to provide a method that allows continuously supplying of the molding device in degassed polymerizable mixture.

The above objects are achieved according to the invention by providing a method for supplying a polymerizable mixture to at least one molding device, said method comprising the following steps:

a) providing a tank containing the polymerizable mixture, b) reaching a set value of pressure in the tank, smaller than the ambient pressure, c) continuously maintaining the pressure in the tank at the set value of pressure while supplying the polymerizable mixture to the molding device through a looping line which both ends are connected to the tank and which is connected to an inlet of said molding device in between said ends, wherein in step c), an entry of inert gas into the tank is controlled based on the pressure contained within the tank.

Step c) of the method ensures that the polymerizable mixture contained in the tank is subjected to a pressure lower than ambient pressure, not only during the formation of said polymerizable mixture, but also while the molding device is being supplied. Therefore, the method of the invention not only ensures the degassing of the polymerizable mixture before it reaches the molding device, but also prevents any further regassing of the polymerizable mixture before it reaches the molding device, notably the regassing due to chemical reaction, the presence of water, gas trapped in the supply device, or due to any other factor.

By "continuous" or "continuously", it is meant "without stopping". The maintaining of the pressure in the tank at the set value of pressure, smaller than ambient pressure, occurs while the supply of the molding device takes place, without stopping, and such maintaining of low pressure in the tank occurs until the tank gets empty or needs to be refilled.

Other characteristics of the method of this invention, taken together or separately, are the following:

the polymerizable mixture contained in the tank is, prior to step b), subjected to a pressure smaller than the set value of pressure, during a predetermined period of time, so as to form a degassed polymerizable mixture;

in step c), the pressure in the looping line, at the inlet of the molding device, is maintained at a value higher than the set value of pressure that is maintained in the tank;

in step c), a flow of polymerizable mixture continuously returns to the tank via the looping line at a flow rate that changes based on the pressure in the looping line, downstream of the inlet of the molding device;

in steps b) and c), the set value of pressure in the tank is at least 0.3 bars under ambient pressure; and in step a), the tank receives the polymerizable mixture, or at least one of the reactants of said polymerizable mixture, from a filing line connected to the tank.

Another object of the invention is to provide a supply device that allows reducing the quantity of defective molded articles exhibiting bubbles trapped therein.

A further object of the invention is to provide a supply device that continuously supplies the molding device in degassed polymerizable mixture.

The above objects are achieved by the supply device for supplying at least one molding device with a polymerizable mixture, comprising:

a tank where is stored the polymerizable mixture, a looping line for supplying the at least one molding device with said polymerizable mixture, the looping line being connected, on a first end, to an outlet of the tank for receiving the polymerizable mixture and, on a second end, to an inlet of said tank for returning to the tank an excess in polymerizable mixture, and, in between said first and second ends, to an inlet of said at least one molding device, a vacuum regulator for reaching a set value of pressure in the tank, smaller than the ambient pressure, and continuously maintaining the pressure in the tank at the set value of pressure, the vacuum regulator being designed to control, on one hand, a vacuum pump connected to the tank for lowering the pressure in the tank, and, on the other hand, an inert gas supplier connected to the tank for increasing the pressure in the tank.

The vacuum regulator allows reaching a given pressure in the tank, smaller than ambient pressure, in order to remove the gas from the polymerizable mixture ahead of the supply of the molding device in polymerizable mixture, but also allows maintaining the pressure in the tank at the given value, even during the supplying of the molding device, in order to prevent any regassing of the polymerizable mixture.

The looping line connected by its two ends to the tank forms a closed loop with the tank in order to allow a continuous supply of the molding device simultaneously with the continuous degassing of the polymerizable mixture contained in the tank.

More precisely, the supply device can supply the molding device in polymerizable mixture without stopping as the polymerizable mixture circulates from the tank to the looping line and returns to the tank, as long as there is enough polymerizable mixture in the tank. While continuously circulating in the looping line and returning back to the tank where the polymerizable mixture is under continuously controlled pressure (at the set value of pressure lower than ambient pressure), the polymerizable mixture is prevented from regassing before it is supplied to the molding device.

Other characteristics of the supply device of this invention, taken together or separately, are the following:

the looping line comprises a pump with adjustable speed for supplying, at a set flow rate, the inlet of said at least one molding device with the polymerizable mixture from the tank;

the looping line comprises a back pressure regulator positioned downstream of the inlet of the molding device and upstream of the inlet of the tank, for maintaining the pressure in the looping line, at the inlet of said at least one molding device, at a value higher than the set value of pressure;

the inlet of the tank is provided with means for orientating the excess in polymerizable mixture against the wall of the tank;

the supply device comprises a level sensor for checking the level of polymerizable mixture inside the tank; and the molding device is a device for molding ophthalmic lenses.

BRIEF DESCRIPTION OF THE DRAWINGS

The following description with reference to the accompanying drawings will make it clear what the invention consists of and how it can be achieved. The invention is not limited to the embodiments illustrated in the drawings. Accordingly, it should be understood that where features mentioned in the claims are followed by reference signs, such signs are included solely for the purpose of enhancing the intelligibility of the claims and are in no way limiting on the scope of the claims.

In the accompanying drawings.

4

DETAILED DESCRIPTION OF THE INVENTION

In the rest of the description, the terms "upstream" and "downstream" will be used in the direction of fluid flow, in order to locate various elements with respect to one another in the supply device.

Similarly, the terms "inlet" and "outlet" will be used in the direction of fluid flow in order to describe the elements that can receive fluid from an inlet and discharge it through an outlet.

A polymerizable mixture is understood to be a mixture of reactants, notably monomers, pre-polymers and/or of polymers that are able to react with one another so as to form a final polymer material. These reactants are known as precursor reactants of the polymerizable mixture.

Here, the polymerizable mixture may for instance be a mixture of reactants that react at least partially with one another simply by being brought into contact, without necessarily requiring any external stimulation, such as a thermal, photonic, chemical or mechanical stimulation.

More particularly, the polymerizable mixture may comprise for instance, in weight relative to the total weight of the polymerizable mixture:

from 45 to 60% of a monomer A, from 45 to 60% of a monomer B, different from the monomer A, from 0.01 to 0.04% of a catalyst, from 1 to 2% of a UV absorber, from 0.05 to 0.15% of a release agent, and, from 0.00001 to 0.00006% of a bluing agent.

The monomer A can be for example a diisocyanate. The monomer B can be for example a dithiol.

Figure 1:
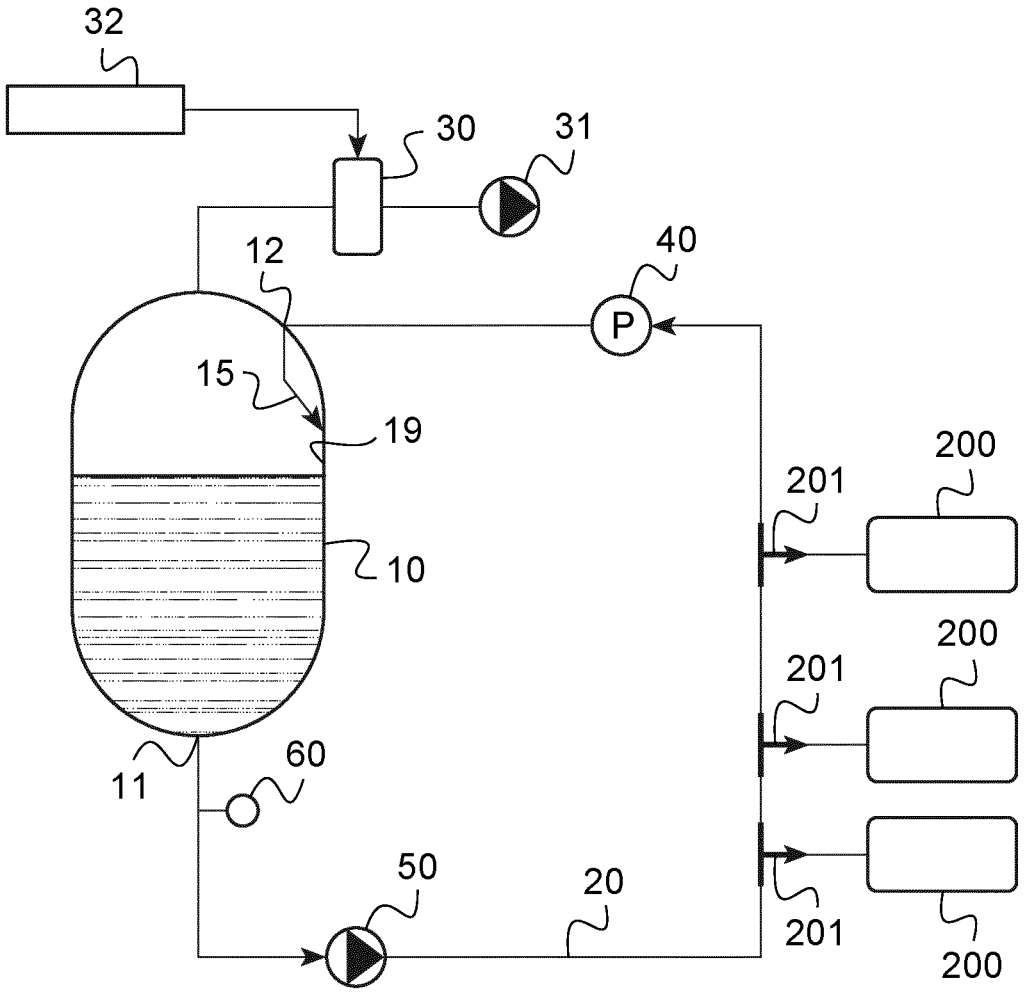
FIG. 1 is a schematic view of a supply device according to the invention.

FIG. 1 shows a supply device 100 of the invention for supplying at least one molding device 200 with a polymerizable mixture. The at least one molding device 200 comprises at least one mold and a means of injection for injecting the polymerizable mixture inside said mold.

Here, the molding device 200 is a device for molding ophthalmic lenses. It thus comprises a plurality of molds, each mold being in the shape of a lens.

As shown on FIG. 1, the supply device 100 here feeds three molding devices 200 with the same polymerizable mixture. Each molding device 200 is plugged on the supply device 100 by a valve 201. Each valve 201 is here in the shape of a "T", as commonly used in the field. When the valve 201 is open, the corresponding molding device 200 is connected to the looping line 20. When the valve 201 is closed, the corresponding molding device 200 is disconnected from the looping line 20. By "connected", it is meant in the rest of the description that the elements are in fluidic communication, the fluid being either a liquid or a gas.

As shown on FIG. 1, the supply device 100 comprises:

a tank 10 where is stored the polymerizable mixture, and a looping line 20 for supplying the at least one molding device 200 with said polymerizable mixture.

More precisely, the polymerizable mixture stored in the tank 10 is preferably a degassed polymerizable mixture, that is to say a polymerizable mixture from which all gases have been removed. To transform the polymerizable mixture into a degassed polymerizable mixture, it is possible to place the polymerizable mixture under a very low pressure, for instance comprised between 0.1 bars or 0.5 bars. Such degassing can for instance occur while the polymerizable mixture is being formed, when mixing its reactants, or just after the polymerizable mixture was formed.

The looping line 20 is connected, on a first end, to an outlet 11 of the tank 10 for receiving the polymerizable mixture and, on a second end, to an inlet 12 of said tank 10 for returning to the tank 10 an excess in polymerizable mixture. In between its first and second ends, the looping line 20 is connected to (respectively disconnected from) an inlet of each of said molding devices 200, by means of the valves 201 in open position (respectively in closed position). As represented in FIG. 1, each of said molding devices 200 forms a dead end, that is to say that once the polymerizable mixture enters the molding device, said polymerizable mixture will not be able to return to the looping line 20. The looping line 20 is here a pipe and its first end can be considered as an inlet of said looping line 20, while its second end and the locations where said pipe is connected to the molding devices 200 can be considered as outlets of said looping line 20.

Thus, when all the valves 201 are closed, the polymerizable mixture contained in the tank 10 flows in a closed loop from the tank 10, through the outlet 11 of the tank 10 into the looping line 20 and back to the tank 10 through the inlet 12 of said tank 10. In other words, when the valves are closed, the looping line 20 and the molding devices 200 are disconnected from one another, while the looping line 20 is still connected to the tank 10. When at least one valve 201 is open, the polymerizable mixture flows from the tank 10, through the outlet 11 of the tank 10 into the looping line 20, and a part of the polymerizable mixture flows from the looping line 20 into the molding device 200 through the corresponding valve 201, while the rest of the polymerizable mixture (commonly called "excess in polymerizable mixture") continues to flow in the looping line 20 beyond said valve 201 to go back to the tank 10, through the inlet 12 of the tank 10. The outlet 11 of the tank 10 can be provided with a valve (not represented) so that it is possible to close said valve in order to disconnect the looping line 20 from the tank 10 if necessary.

According to the invention, the supply device 100 also comprises a vacuum regulator 30.

The vacuum regulator 30 aims at reaching a set value of pressure Ps in the tank 10 and at maintaining the pressure P in the tank 10 at said set value of pressure Ps, even when the molding devices 200 are being supplied in polymerizable mixture through the looping line 20. Here, the vacuum regulator 30 is for instance a mechanical vacuum regulator. In the present example, the vacuum regulator 30 is connected to the tank 10. Preferably, it is connected to the tank 10 in a part where the polymerizable mixture cannot get, preferably in the upper part of the tank 10, so that only gases can flow between the vacuum regulator 30 and the tank 10.

The set value of pressure Ps that is to be reached and maintained in the tank 10 is smaller than the ambient pressure Pam. Preferably, the set value of pressure Ps to be reached in the tank 10 is at least 0.3 bars under the ambient pressure Pam. More preferably, the set value of pressure Ps is between 0.3 to 0.5 bars under the ambient pressure Pam. In other words, the set value of pressure Ps is preferably comprised in the range [Pam—0.5; Pam—0.3], the ambient pressure Pam and the set value of pressure Ps being given in bars. The ambient pressure Pam is here defined as the pressure of the atmosphere outside the tank 10. Such range of pressure for the set value of pressure Ps prevents the regassing of the polymerizable mixture in the tank 10, while the molding devices 200 are being supplied in degassed polymerizable mixture. Such range of pressure for the set value of pressure Ps is a low pressure that is a good compromise, compatible with the higher pressure to which is exposed the degassed polymerizable mixture within the looping line 20 and feed the molding devices 200.

Of course, it is also possible that the set value of pressure Ps is itself a range, instead of being a precise value. In such case when the set value of pressure Ps is an interval (or range), "the pressure P is higher than the set value of pressure Ps (P>Ps)" means that the pressure P is in fact higher than the upper limit of the range. Similarly, when the set value of pressure Ps is an interval (or range), "the pressure P is lower than, or smaller than, the set value of pressure Ps (P<Ps)" means that the pressure P is in fact lower than the lower limit of said range.

Here, the vacuum regulator 30 comprises a pressure sensor to measure the pressure P inside the tank 10.

To be able to reach the set value of pressure Ps and maintain the pressure P in the tank 10 at said set value of pressure Ps, the vacuum regulator 30 is designed to control a vacuum pump 31 that is connected to the tank 10 for lowering the pressure P in the tank 10.

The vacuum regulator 30 is able to measure the pressure P inside the tank 10 and to control the vacuum pump 31 in order to continuously adjust said pressure P inside the tank 10 to the set value of pressure Ps.

In the present example, as illustrated on FIG. 1, the vacuum pump 31 is connected to the vacuum regulator 30. In other words, the vacuum pump 31 is connected to the tank 10 through the vacuum regulator 30 that is itself connected to the tank 10.

The vacuum regulator 30 is able to measure the pressure P inside the tank and to control the vacuum pump 31 in order for it to withdraw some of the gas(es) contained in the tank 10 whenever said pressure P is higher than the set value of pressure Ps.

The supply device 100 of the invention thus prevents regassing of the polymerizable mixture, that is to say prevents some gas to be dissolved in the polymerizable mixture once the supply of the molding devices 200 has started. The regassing is for instance caused by leaks of the looping line 20, trapped gas in the looping line 20, pump cavitation or even chemical reactions. Thanks to the supply device 100 of the invention, the polymerizable mixture is degassed before it starts to flow in the looping line 20, but also each time it reaches the tank 10 after it flew in the looping line 20. The potential regassing of the polymerizable mixture is prevented because the pressure in the tank 10 is continuously controlled.

Advantageously, as shown on FIG. 1, the looping line 20 of the supply device 100 of the invention, also comprises, a pump 50, with adjustable speed, for supplying at a set flow rate the inlet of said at least one molding device 200 with the polymerizable mixture from the tank 10.

The pump 50 eases the flow of polymerizable mixture inside the looping line 20 towards the valves 201 and into the molding devices 200 so that less pressure needs to be applied in the tank 10 for pushing the polymerizable mixture through the outlet of said tank 10. In other words, thanks to the pump 50, the pressurization of the polymerizable mixture in the tank 10 can be lowered without affecting the flow of polymerization in the looping line 20. Lowering the pressure P inside the tank 10 lowers the risk of regassing the polymerizable mixture.

Thanks to the pump 50, the pressure in the looping line 20, at the inlet of the molding device 200, is maintained at a value higher than the set value of pressure Ps that is maintained in the tank 10.

Advantageously, as shown on FIG. 1, the looping line 20 of the supply device 100 of the invention comprises, in addition, a back pressure regulator 40 located downstream of the inlet of the molding device 200 and upstream of the inlet 12 of the tank 10. Such back pressure regulator 40 regulates the pressure at the inlet of said at least one molding device 200.

More precisely the back pressure regulator 40 aims at balancing the pressure in the looping line 20, in order for the molding devices 200 to be fully filled. It therefore prevents the introduction of air inside the molds of the molding devices 200.

To do so, the back pressure regulator 40 is designed to act on the flow rate of the polymerizable mixture that returns to the tank 10 through the looping line 20, said flow rate being set based on the pressure in the looping line 20, downstream of the inlet of the molding devices 200. In fact, when at least one valve 201 leading to the molding device 200 is open, the pressure in the looping line 20, upstream of said valve 201, is naturally higher than the pressure in the looping line 20, downstream of said valve 201, because some polymerizable mixture flew into the corresponding molding device 200 and is therefore "missing" in the looping line 20. The balance of pressure operated by the back pressure regulator 40 also forces the polymerizable mixture to flow beyond said valves 201, back into the tank 10.

In other words, the supply device 100 of the invention allows maintaining two different pressures in the closed loop: a first pressure in the tank 10, fixed at the set value of pressure Ps, lower than ambient pressure Pam, that prevents regassing of the polymerizable mixture, and a second pressure in the looping line 20, higher than the set value of pressure Ps, usually near ambient pressure Pam or higher than ambient pressure Pam, in order to properly fill the molding devices 200.

Advantageously, the vacuum regulator 30 is here also designed to control an inert gas supplier 32 connected to the tank 10 for increasing the pressure P in the tank 10.

In the present example, as illustrated on FIG. 1, the inert gas supplier 32 is connected to the vacuum regulator 30. In other words, the inert gas supplier 32 is connected to the tank 10 through the vacuum regulator 30 that is itself connected to the tank 10.

The vacuum regulator 30 is thus able to control the inert gas supplier 32 in order for it to add some inert gas inside the tank 10 whenever the measured pressure P inside the tank 10 is lower than the set value of pressure Ps. The pressure P measured inside the tank 10 can for instance be lower than the set value of pressure Ps when the level L of polymerizable mixture is getting down in the tank 10 because of the molding devices 200 being supplied in degassed polymerizable mixture.

In the present example, the inert gas supplier 32 is designed to introduce nitrogen (N) in the tank 10 when the pressure P inside the tank is lower than the set value pressure Ps. In other words, the inert gas supplier 32 supplies nitrogen to compensate for the pressure variations. The use of nitrogen (N), which is a dry inert gas, prevents the introduction of humidity in the tank 10 and prevents that the atmosphere of the tank 10 reacts with the polymerizable mixture stored therein. We here call "atmosphere" of the tank 10 the material that is enclosed inside the tank 10 and that is not degassed polymerizable mixture nor any other liquid material. Of course, the inert gas supplier can introduce other inert gases into the tank 10, such as argon or helium instead of nitrogen, or even a mix of inert gases.

Thus, during the whole process of supplying the molding devices 200 with polymerizable mixture, the supply device 100 of the invention allows, on one hand, the removal of the gas that is dissolved in the polymerizable mixture, such removal of dissolved gas occurring thanks to the vacuum pump 31, and, on the other hand, preventing the pressure in the tank 10 to get to low, such prevention occurring thanks to the inert gas supplier 32. In other words, thanks to the vacuum regulator 30 controlling the vacuum pump 31 and the inert gas supplier 32, a partial vacuum is applied inside the tank 10 in order to remove the dissolved gas from the polymerizable mixture while the degassed polymerizable mixture is however still sufficiently pressurized, at the set value of pressure Ps, to be able to flow in the looping line 20 and to be supplied to the molding devices 200 at a high pressure. Thanks to the vacuum regulator 30, the pressure in the tank 10 is maintained at the set value of pressure Ps, therefore allowing a balance of pressure with the looping line 20 in which higher pressures are met.

In an advantageous embodiment of the supply device 100 of the invention, such as the one shown on FIG. 1, the supply device 100 comprises, in addition, a level sensor 60 for checking the level L of polymerizable mixture inside the tank 10. This level sensor 60 prevents damaging the pump 50 and allows stopping the flow of polymerizable mixture into the looping line 20 and into the molding devices 200 when the level L of polymerizable mixture within the tank 10 is lower than a predetermined set value of level Ls. Such stopping notably occurs when the tank 10 is empty, or at least does not comprise enough polymerizable mixture to ensure the correct filling of the molds of the molding devices 200. The set value of level Ls is predetermined based on the number of molding devices 200 and their characteristics, such as the number of molds they comprise and their injection rate. The set value of level Ls may also depend on the size of the tank 10 and on the flow rate set by the pump 50 in the looping line 20.

In a further advantageous embodiment of the supply device 100 of the invention, such as the one shown on FIG. 1, the inlet 12 of the tank 10 is provided with means 15 for orientating the excess in polymerizable mixture returning to the tank 10 against a wall 19 of the tank 10. Such means is schematically represented by an arrow on FIG. 1. The means 15 for orientating the polymerizable mixture is here designed to maximize the contact surface between the polymerizable mixture and the wall 19 of the tank 10. In other words, the means 15 for orientating the polymerizable mixture forces the polymerizable mixture to touch the wall 19 of the tank 10 in order to form a thin sheet of polymerizable mixture sliding down said wall 19 of the tank 10. The means 15 can in addition be designed to widen the surface of the flow of polymerizable mixture.

Such means 15 therefore lowers the risk that the polymerizable mixture regasses due to turbulences caused when the excess of polymerizable mixture drops violently on the surface of the polymerizable mixture lying in the tank 10. In addition, the means 15 for orientating the polymerizable mixture increases the contact surface between the excess in polymerizable mixture returning to the tank 10 and the atmosphere of the tank 10, thus enhancing the degassing of said excess in polymerizable mixture returning to the tank 10.

Figure 3:
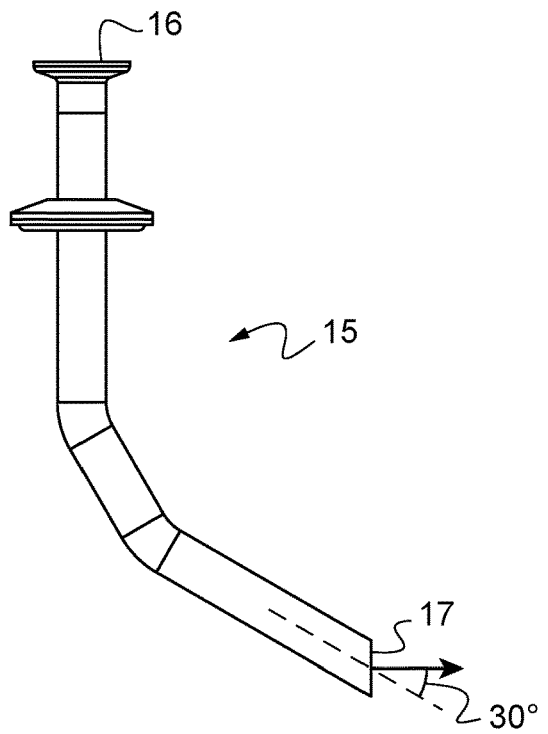
FIG. 3 is a lateral view of a wall wiper distributor included in one embodiment of the supply device according to the invention.

In the present example, the means 15 for orientating the polymerizable mixture comprises a wall wiper distributor 15 as the one illustrated on FIG. 3. As shown on FIG. 3, the wall wiper distributor 15 comprises an inlet 16 designed to be connected to the inlet 12 on the tank 10, and an outlet 17 located so as to face the wall of the tank 10. The inlet 16 and the outlet 17 of the wall wiper distributor 15 are connected to one another through a pipe (here a cylinder pipe) that is curved in order to place the outlet 17 close to and facing the wall 19 of the tank 10. The outlet 17 is delineated by a cylindrical wall (or cylinder) which free end is cut obliquely relatively to the axis of extension of the cylinder so as to form a sort of beak pointing towards the wall 19 of tank 10. Here, the angle formed between the normal to the section of the free end of the cylinder and the axis of extension of said cylinder is about 30°.

In an advantageous embodiment, not shown on FIG. 1, the supply device comprises a filing line connected to an inlet of the tank. The inlet of the tank at which is connected the filling line can either be the same inlet 12 as the one at which the looping line 20 is connected or be a distinct inlet. The filling line is distinct and separate from the looping line 20. Such filling line allows filling the tank 10 with fresh (or new) polymerizable mixture or with at least one of the reactants of said polymerizable mixture. In other words, thanks to the filling line, the tank 10 can at the same time be emptied by flowing the polymerizable mixture in the looping line 20 and into the molding devices 200, and filled in by the introduction of new (or fresh) polymerizable mixture from the filling line. The introduction of fresh (new) polymerizable mixture in the tank 10 is for instance based on the measure of the level L of polymerizable mixture in the tank 10, made by the level sensor 60 previously described. Such filling line allows continuous operation of the molding line, as the filling of the molds does not need to be stopped for refilling the tank 10, said tank 10 being designed to be able to continuously receive fresh polymerizable mixture from the filling line. Of course, it is possible to provide the inlet of the tank 10 at which is connected the filling line with means for orientating the fresh polymerizable mixture arriving in the tank 10 against the wall 19 of the tank 10, in a similar way as what was described above for the looping line 20.

It is also possible that the supply device 100 of the invention comprises a control unit (not represented). The elements of the supply device 100 such as the valves 201, the pump 50, the vacuum regulator 30 and the back pressure regulator 40 are therefore designed to be controlled by said control unit. Such control unit is for instance designed to receive information from the vacuum regulator 30 and/or from the level sensor 60 and/or from the back pressure regulator 40 (when the supply device 100 is equipped with such). Of course, it is also possible to control the supply device 100 manually, by checking information given by the vacuum regulator 30, the level sensor 60 and the back pressure regulator 40 (when the supply device 100 is equipped with such).

The invention also relates to a method for supplying the polymerizable mixture to the at least one molding device 200. The method of the invention comprises the following steps:

a) providing the tank 10 containing the polymerizable mixture, b) reaching the set value of pressure Ps in the tank 10, smaller than the ambient pressure Pam, c) continuously maintaining the pressure P in the tank 10 at the set value of pressure Ps while supplying the polymerizable mixture to the molding device 200.

In practice, the method of the invention is for instance implemented with the supply device 100 of the invention.

Figure 2:
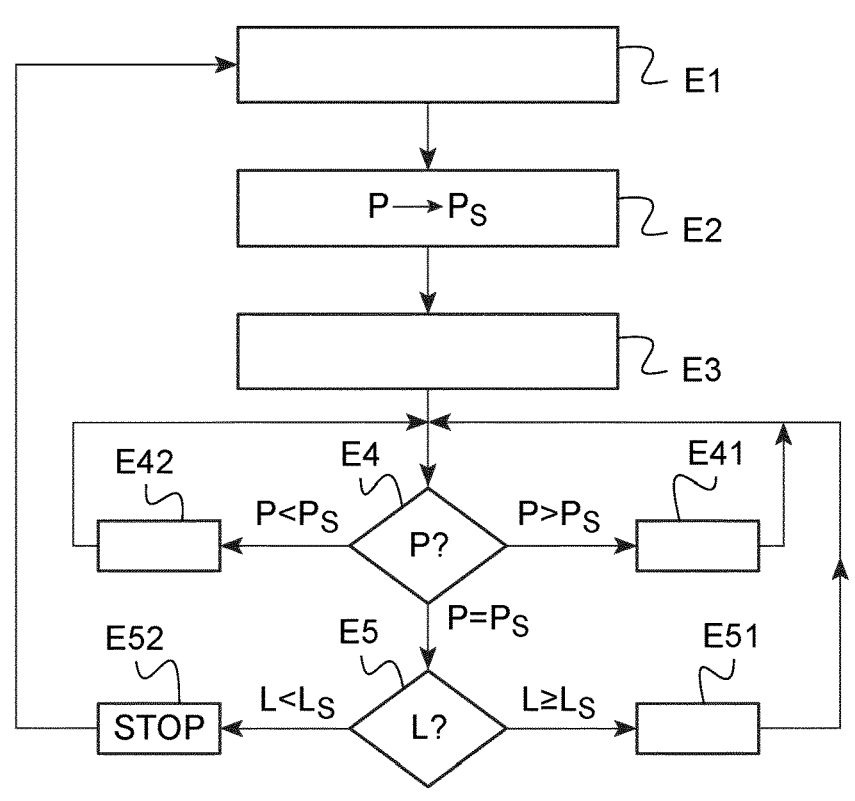
FIG. 2 is a flowchart of the main steps of the method according to the invention.

Such method is more precisely illustrated on FIG. 2 and is for instance implemented by the control unit of the supply device 100, using the supply device 100.

Step a) of the method is illustrated by the box referenced E1 on FIG. 2. At step a), the tank 10 is for instance filled with the polymerizable mixture that has been formed in a step prior to step a). Alternatively, it is possible to mix, at step a), the various reactants of the polymerizable mixture within the tank 10 in order to form the polymerizable mixture directly inside the tank 10. It is also possible, in step a), that the tank 10 receives the polymerizable mixture, or at least one of the reactants of said polymerizable mixture, from a filing line connected to the tank 10.

Advantageously, prior to step b), the polymerizable mixture contained in the tank 10 is subjected to a pressure smaller than ambient pressure Pam, preferably lower that the set value of pressure Ps, during a predetermined period of time, so as to form a degassed polymerizable mixture. The degassing of the polymerizable mixture by placing said polymerizable mixture under a low pressure can for instance occur inside the tank 10, using the vacuum pump 31. The low pressure applied to the tank 10 for degassing the polymerizable mixture can for instance be comprised between 0.1 and 0.3 bars. Alternatively, the degassing of the polymerizable mixture could occur at a pressure equal to the set value of pressure Ps, but the step of degassing would therefore last longer than when the degassing occurs at a pressure lower than said set value of pressure Ps. This degassing step occurs during a finite time, and stops once steps b) and c) are implemented.

Alternatively, it is also possible that the polymerizable mixture contained in the tank 10 at step a) is already a degassed polymerizable mixture, degassed in a step prior to step a).

Once step a) is achieved, step b) is implemented prior to step c).

At step b) (box referenced E2), the control unit of the supply device 100 controls the vacuum regulator 30 that itself controls the vacuum pump 31 in order to adjust the pressure P inside the tank 10 and reach the set value of pressure Ps. The set value of pressure Ps is the same as the one defined previously. Of course, if the pressure P inside the tank 10 is lower than the set value of pressure Ps, it is possible to increase said pressure by letting gas flow inside the tank 10. For instance, it is possible to use the inert gas supplier 32 to increase the pressure inside the tank 10 to reach the set value of pressure Ps.

At step c), the polymerizable mixture is supplied to the molding device 200 while the pressure in the tank 10 is maintained at the set value of pressure Ps. Such supply here occurs through the looping line 20 which both ends are connected to the tank 10 and which is plugged to an inlet of said molding device, in between said ends, by means of a valve 201.

Preferably, step c) comprises a first sub-step during which the filling of the looping line 20 occurs while the pressure in the tank 10 is maintained at the set value of pressure Ps (box referenced E3 on FIG. 2), and a second sub-step during which the molding devices are supplied in degassed polymerizable mixture (boxes referenced E4, E41, E42, E5 and E51 on FIG. 2).

The first sub-step of step c) (box referenced E3) occurs while the valves 201 connecting said looping line 20 to the molding devices 200 are closed so that the inlet of each molding device 200 is disconnected from the looping line 20. To allow the polymerizable mixture to flow in the looping line 20, the pressure P inside the tank 10 is controlled to be at the set value of pressure Ps, so that it is lower than ambient pressure Pam, but still sufficient for the polymerizable mixture to fill the portion of the looping line 20 that connects the outlet 11 of the tank 10 to the pump 50. Once the pump 50 is submerged with polymerizable mixture, which implies that the pump 50 is purged from the gases it may contained, it is switched on to fill the whole looping line 20 and to return the polymerizable mixture to the tank 10 via the inlet 12 of the tank 10 and through the means 15 for orientating said polymerizable mixture against the wall 19.

In step c), once the looping line 20 is filled with degassed polymerizable mixture, the pressure in said the looping line 20, at the inlet of the molding device 200, is set at a value higher than the set value of pressure Ps that is maintained in the tank 10, and then maintained at said high value of pressure. Such difference of pressure between the tank 10 and the inlet of the molding device 200 is possible thanks to the pump 50 and the back pressure regulator 40 which can increase the pressure in the looping line 20.

Once the tank 10 and the looping line 20 are both filled with degassed polymerizable mixture, and the pressure P inside the tank 10 is at the set value of pressure Ps, while the pressure at the inlet of the molding device is at a higher chosen value, the molding devices 200 are supplied with degassed polymerizable mixture at step c). Such supply of the molding devices 200 with the degassed polymerizable mixture is represented by the set of boxes referenced E4, E41, E42, E5 and E51 on FIG. 2.

In order to guarantee that the pressure P inside the tank 10 is at the set value of pressure Ps while supplying the molding devices 200, the vacuum regulator 30 regularly measures, preferably at very high frequency, the pressure P inside the tank 10 and the control unit then compares said pressure P with the set value of pressure Ps (box referenced E4).

If the pressure P inside the tank 10 is greater than the set value of pressure Ps (box referenced E41), the control unit controls the vacuum regulator 30 for it to control the vacuum pump 31 in order to lower said pressure P inside the tank 10.

If the pressure inside the tank 10 is lower than the set value of pressure Ps (box referenced E42), the control unit controls the vacuum regulator 30 for allowing gas inside the tank 10. Preferably, the vacuum regulator 30 here controls the inert gas supplier 32 in order to increase the pressure P inside the tank 10.

If the pressure P inside the tank 10 is equal to the set value of pressure Ps (P=Ps), then the control unit checks the level L of polymerizable mixture enclosed within the tank 10, said level L being for instance given by the level sensor 60 (box referenced E5).

If the level L is sufficient, that is to say is higher than or equal to the predetermined set value of level Ls (L≥Ls), then the control unit controls the supply of degassed polymerizable mixture to the molding devices 200 (box referenced E51 on FIG. 2). To do so, the control unit for instance controls the flow rate of the pump 50, the opening of at least one of the valves 201, the injection means of the corresponding molding devices 200 and the back pressure regulator 40 in order to fill in the molds while keeping the pressure at the inlet of the molding devices at a high value. The control unit therefore guarantees that the supply is balanced in terms of pressure and quantity of polymerizable mixture flowing in the looping line 20 and returning back to the tank 10. Indeed, as explained, while the molding devices 200 are supplied in degassed polymerizable mixture, a flow of degassed polymerizable mixture in excess continuously returns to the tank 10 via the looping line 20. More precisely, the polymerizable mixture returns to the tank 10 at a flow rate that changes based on the pressure in the looping line 20, downstream of the inlet of the molding device 200. This flow rate for instance depends on the number of molding devices 200 being supplied in polymerizable mixture at the same time, that is to say on the number of valves 201 that are simultaneously open.

In step c), in order to compensate for the pressure P inside the tank 10 that is lower than the set pressure value Ps, due to filling of the molding devices 200, it is possible to control an entry of gas, preferably an entry of inert gas, into the tank 10. Here, the control of the entry of inert gas is based on the pressure P contained within the tank 10. In practice, the entry of inert gas is here made through the vacuum regulator 30 and the inert gas supplier 32.

If the level L of polymerizable mixture in the tank 10 is lower than the set value of level Ls (L<Ls), then the control unit stops the supply of the polymerizable mixture (box referenced E52 on FIG. 2). It implies that the control units controls the closing of the valves 201, the stopping of the pump 50 and the closing of the potential valve located at the outlet 11 of the tank 10. The tank 10 is then refilled with fresh polymerizable mixture and the method starts again from step a) (box referenced E1).

Figure 4:
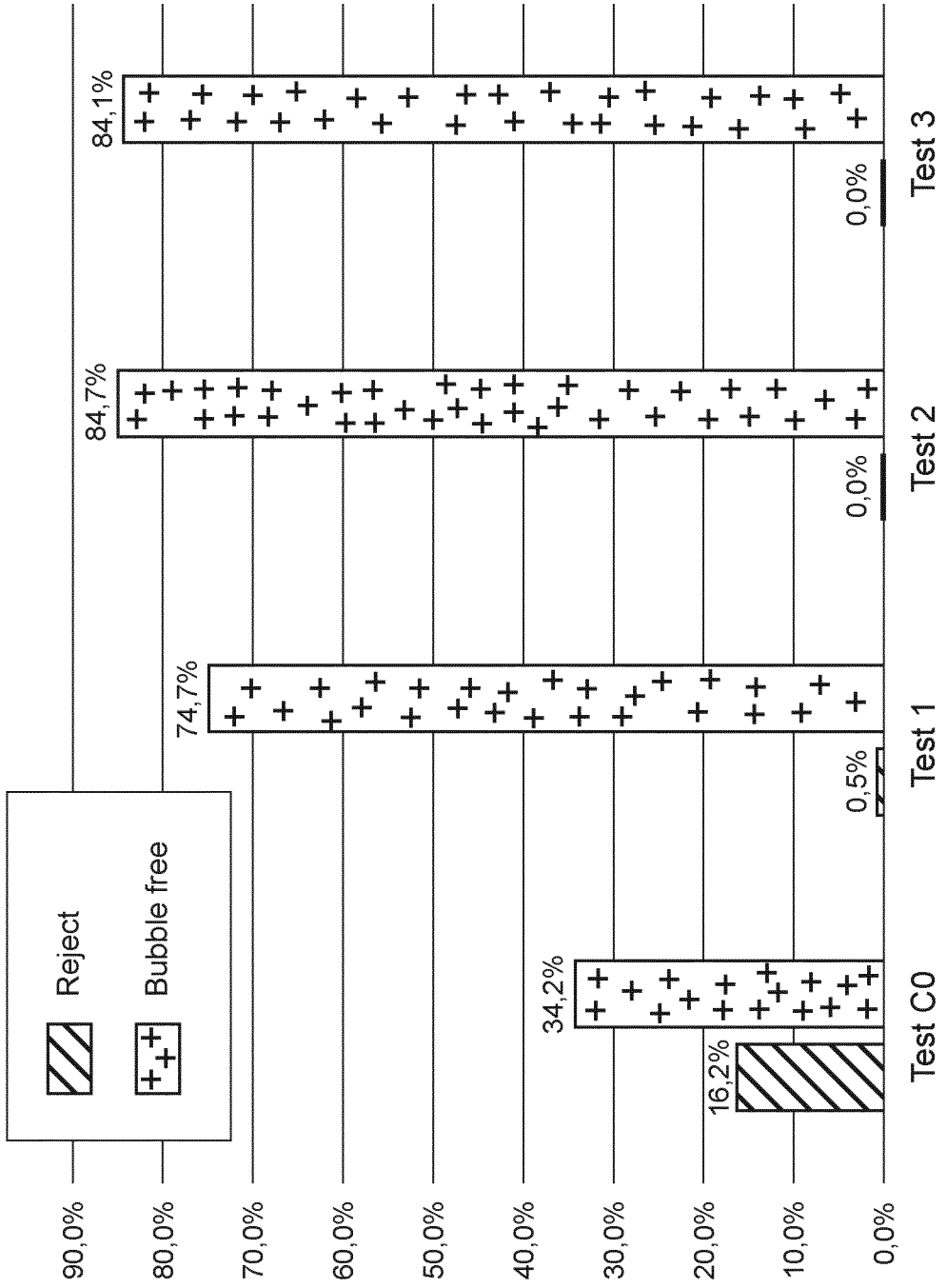
FIG. 4 is a graph giving the percentage of bubble free lenses and of rejected lenses obtained with the supply device and/or the method of the invention (Tests 1, 2 and 3) as compared to those obtained with a traditional supply device and/or method ("Test CO").

On FIG. 4 is illustrated a graph showing the percentage of lenses that are rejected ("reject") after being molded and the percentage of lenses that are bubble free ("bubble free") after being molded, that is to say that do not include any bubbles. Such percentages are given for lenses obtained in a comparative test (Test CO on FIG. 4) implemented with a traditional device and/or method in which the pressure is not continuously controlled during the supply of the molds, and are also obtained in 3 other tests (Test 1, Test 2 and Test 3 on FIG. 4) implemented with the device and/or the method of the invention in which the pressure is continuously maintained at the set value of pressure Ps during the supply of the molds. From FIG. 4, it can be concluded that the supply device 100 and the method of the invention allow obtaining more lenses that are bubble free, and less rejected lenses. In other words, it can be concluded from FIG. 4 that the supply device 100 and/or the method of the invention allow reducing the gas re-dissolved in the polymerizable mixture, even after the polymerizable has been initially degassed, and therefore increasing the lenses that are bubble free after they are molded. On the contrary, the traditional supply device and/or method results in gas being dissolved in the polymerizable mixture after it has been initially degassed, and therefore in more lenses that include bubbles and that are rejected because they cannot be used or sold.

The invention is not limited to the examples here above described. Notably, in an embodiment not illustrated, it is possible that the vacuum regulator of the supply device according to the invention comprises a pressure sensor and a controller that are physically separated. The pressure sensor of such vacuum regulator is connected to the tank and located on the top of the tank in order to measure the pressure of the atmosphere inside the tank. The controller is located at distance from the tank and does not need to be connected to the tank. The controller can for instance be part of the control unit of the supply device. The pressure sensor is able to communicate with the controller, which itself is able to communicate with the vacuum pump and the inert gas supplier in order to control them. In such embodiment, the vacuum pump and the inert gas supplier are directly connected to the tank, by an inlet, either a common inlet or a distinct inlet.

The invention claimed is:

1. A method for supplying a polymerizable mixture to at least one molding device, said method comprising the following steps:
   a) providing a tank containing the polymerizable mixture;
   b) reaching a set value of pressure in the tank, smaller than an ambient pressure; and c) continuously maintaining the pressure in the tank at the set value of pressure, by means of a vacuum regulator connected to the tank, while supplying the polymerizable mixture to the molding device through a looping line, both ends of which are connected to the tank and which is connected to an inlet of said molding device in between said ends;

wherein in step c), an entry of inert gas into the tank is controlled based on the pressure contained within the tank.

2. The method of claim 1, wherein the polymerizable mixture contained in the tank is, prior to step b), subjected to a pressure smaller than the set value of pressure, during a predetermined period of time, so as to form a degassed polymerizable mixture.

3. The method of claim 1, wherein in step c), the pressure in the looping line, at the inlet of the molding device, is maintained at a value higher than the set value of pressure that is maintained in the tank.

4. The method of claim 1, wherein, in step c), a flow of polymerizable mixture continuously returns to the tank via the looping line at a flow rate that changes based on the pressure in the looping line, downstream of the inlet of the molding device.

5. The method of claim 1, wherein in steps b) and c), the set value of pressure in the tank is at least 0.3 bars under ambient pressure.

6. The method of claim 1, wherein in step a), the tank receives the polymerizable mixture, or at least one reactant of said polymerizable mixture, from a filing line connected to the tank.

7. A method for supplying a polymerizable mixture to at least one molding device, said method comprising the following steps:

a) providing a tank containing the polymerizable mixture;

b) reaching a set value of pressure in the tank, smaller than an ambient pressure; and c) continuously maintaining the pressure in the tank at the set value of pressure while supplying the polymerizable mixture to the molding device through a looping line, both ends of which are connected to the tank and which is connected to an inlet of said molding device in between said ends;

wherein in step c), an entry of inert gas into the tank is controlled based on the pressure contained within the tank, wherein, in step c), the pressure in the looping line, at the inlet of the molding device, is maintained at a value higher than the set value of pressure that is maintained in the tank, by means of a back pressure (40 in FIG. 1) regulator positioned downstream of the inlet of the molding device and upstream of the inlet of the tank.

* * * * *